UNITED STATES PATENT OFFICE.

WILLIAM M. GROSVENOR, OF RIDGEWOOD, NEW JERSEY, AND LOUIS A. BEECHER, OF NEWTONVILLE, MASSACHUSETTS.

MANUFACTURING COLLOIDS.

1,214,299. Specification of Letters Patent. Patented Jan. 30, 1917.

No Drawing. Application filed October 7, 1913, Serial No. 793,807. Renewed June 30, 1915. Serial No. 37,369.

*To all whom it may concern:*

Be it known that we, WILLIAM M. GROSVENOR and LOUIS A. BEECHER, both citizens of the United States, and residents of Ridgewood, Bergen county, New Jersey, and Newtonville, county of Middlesex, and State of Massachusetts, respectively, have invented certain new and useful Improvements in Manufacturing Colloids, of which the following is a specification.

Our invention relates to the art of manufacturing hydrated colloids, such as the easily dissociated hydration products of colloids like gellatin, fibrin, starch, keratin, cellulose, albumin and similar organic bodies, and consists in part, of a new form of colloid specially susceptible to adjustment of degree of hydration, and to methods of carrying out the process to produce the same, and of properly preserving it when produced.

We have discovered that if hydrated colloids containing an excessive amount of water are first formed and the dissociation of such hydrated compounds is effected in a certain manner, a product is produced which shows a hitherto unknown capacity for rapid adjustment of its degree of dehydration. This new product, which we call a diffuse colloid, may be hydrated with great rapidity (a very few hours) or may be rapidly dehydrated, or the different degrees of hydration at different portions of a mass thereof may be quickly adjusted and equalized so that the products thus prepared have great advantages for certain purposes. We have also found that, owing to this very sensitiveness, the manufacture requires a peculiarly accurate adjustment of the conditions of formation which can in practice hardly be obtained except by automatic control, and that the product produced, and therefore the conditions of its formation, must be adjusted to suit the conditions surrounding its subsequent use and storage, *i. e.*, when one is necessarily varied the other must be suitably varied in accordance therewith and the relation between them in practice must be accurately controlled, preferably by automatic devices.

The invention consists in the discovery of this new product or form of colloid substances which we prefer to call diffuse colloids, in the process of making them, *i. e.*, by producing excessive or superhydration, followed by properly graduated dehydration, and finally, if desired, the rapid equalizing of hydration; also in the discovery of the necessary accurate automatic regulation of the hygrometric conditions of formation, and further in the discovery of the proper correlation between the conditions of formation or equalizing and the desired conditions of subsequent treatment or use, and the discovery of the proper manner of securing this correlation between terminal conditions of formation and subsequent treatment.

We are well aware that colloid gels have been produced and dried and otherwise dehydrated with a view to making substances for mechanical use that will be as unaltered as possible by weather changes (*e. g.*, lumber for construction work), or dried with a view to preservation (*e. g.*, glue and gelatin as commonly prepared for the market), and that when the latter products were to be again dissolved they have sometimes been finely ground, rendered microscopically porous by admixture with gas evolving constituents, or dried in the form of spray to powder, in order to facilitate mechanical solution; but, so far as we are aware, no attempt has been made to take advantage of the micellular structure of the colloid gel to produce submicroscopically expanded, or as we call them, "diffuse" colloids, and no one has conceived that by suitable control of the rate and conditions of dehydration such a submicroscopically porous or diffuse condition could be produced, or of the valuable properties of such a product.

In carrying out our invention we first fully expand or gelatinize the colloid. The precise amount of water required for this depends on the colloid and to some extent on its previous condition. We can only say that we have used, for instance, gelatin with not less than an equal weight of water, with glue not less than 25% by weight, with cellulose 25%, and with starchy products, from 20–40%. The exact amount of water used does not seem to materially affect the resulting product provided in each case sufficient is used, and in each new case this can only be determined by test of the particular material. It is therefore recommended always to take an ample excess. We next submit the expanded colloid to care-fully regulated conditions of dehydration by increasing or changing the drying power of the dehydration agent, tending, we believe, to preserve the gel structure unaltered by the increased proportion of sols, and as rapidly as possible consistent therewith, to remove the water from the structure, care, however, being taken not to eliminate water so rapidly that the expanded condition is destroyed, due, we believe, to the micellular structure being ruptured or collapsed. With gelatins and other gels peptinized by heat this dehydration must be done at low temperature approaching the freezing point. The less readily peptinized colloids such as starch and cellulose may be dehydrated at high temperatures. With granular starch this is limited by the temperature of rupture (about 140° F.) and a correspondingly slower process must be used than with cellulose. With the latter, however, it is preferable to approach or exceed 212°, taking care that moisture is not removed too rapidly at any particular stage. We believe that this limit is due to the rate at which the water can pass through the walls of the micels without injury to the wall structure. With cellulose derived, for instance, from *Linum usitatissimum* we prefer a preliminary hydration of about eighty per cent. "free water." This is then plunged into a rapidly stirred or circulated atmosphere of superheated steam and air, consisting of air 66%, water 30% by weight, at a temperature of 200–212° F. This atmosphere is then gradually dehydrated (by desiccating agents, condensers, etc., or any well known means, while maintaining the temperature substantially constant) for about 1 hour at such a rate that the cellulose shall nowhere be subjected to extremely desiccated atmosphere, but at the end of this time shall contain about 9%–6% moisture after which the temperature is steadily lowered to about 110° F., while maintaining approximately the same relative amount of superheat or degree of temperature above saturation to the moisture present in the circulating atmosphere. This of course means a relatively larger proportion of air or other "fixed gas" in the atmosphere, approaching 95% air to 5% moisture (weight) at 110° F. After this the cellulose is allowed to cool in an atmosphere of about 80° to 90° F. (preferably the temperature at which it is to be used or stored) in an atmosphere of aqueous vapor and air having little if any superheat, and we so regulate this slight superheat if any, or the time of exposure while cooling, or both, that a diffuse colloid of the required degree of hydration, is produced.

The resulting product is characterized by certain differences making it clearly distinguished from colloids prepared in the usual way by drying. While there is not necessarily any material difference in moisture content, and they are substantially dry, the diffuse colloids show slightly lowered densities, materially increased rates of hydration or dehydration under given conditions, and increased adsorption of dyes or other chemicals, the latter being far more equalized and regular throughout the material.

The exact procedure that takes place within the colloid mass is not positively known, but we believe it to be as follows: The formation of the superhydrated colloid creates a structure like a framework of hydrogel molecules inclosing (because of the large quantity of water present) a proportion of hydrosol particles between the meshes of this framework. The process of dissociation or dehydration being carried out in the regulated manner described, avoids the destruction of this mechanical framework of hydrogel particles and causes progressive segregation of reversible hydrogel particles against the framework as elimination of water proceeds, until the hydrosol particles have nearly all been progressively attached to the hydrogel framework, after which the regulated procedure of dehydration continues without destruction of the framework, with greater rapidity than would otherwise be possible owing to the diffuse condition of the colloid. Likewise, this diffuse form of the colloid is extremely susceptible to rehydration or to redistribution of moisture within the mass, and to solution in suitable solvents, when desired.

It is found desirable to adjust the final conditions of the first treatment (particularly the temperature) so as to adapt the material for its subsequent equalizing or any other treatment. The temperature of the material being too high on entering the second stage a remarkable result is observed, *i. e.*, that, even though the aqueous concentration of the second medium is relatively high, sudden dehydration ensues and not only prolongs the time required for effecting the desired equalization, but is detrimental to the physical and adsorption qualities of the material. If, on the other hand the temperature at the end of the first stage is too low rehydration ensues too suddenly, and proper equalization is retarded. After repeated attempts to control this relative adjustment by ordinary means with repeated failures due to unknown causes, the need of automatic regulation of the first stage conditions (particularly temperature) with reference to later treatment, was discovered. This automatic regulation of conditions and operation may be carried out by any suitable or well-known means for automatically regulating temperature and humidity. Applicants prefer to use the arrangement shown in their application, Serial No. 588,960, filed October 25, 1910.

The process herein described differs diametrically from the usual process of dehydrating colloids as for instance animal glue which is best dehydrated so rapidly that superficial hardening or skinning is produced as quickly as possible, also for instance from the processes of drying used for fibrous solids (such as timber and large bodies generally). It is customary to "steam" or "sweat" the lumber as a preliminary stage to drying. The object of doing this, however, being to heat the large pieces clear through to the heart so that evaporation may be continuous from within. Some state that it also opens up the pores or separates the fibers of the wood, but no such action (as herein described) on the colloidal cellulose of the single fiber has hitherto been known, and the object of the adjusted conditions is different. In fact for ordinary drying processes, as for instance with lumber, it would be regarded as most unwise to use this process and the diffuse colloidal condition would be most undesirable because instead of the lumber being thoroughly cured and remaining dry when once dried, it would be particularly susceptible to changes in humidity, rapidly taking up and losing water, swelling and shrinking abnormally in consequence.

Having described our process in great detail for two specific substances and methods of adjusting conditions, it is obvious that the invention is applicable to other colloids and that it only requires a few preliminary tests and examinations of the resulting product by one skilled in the art to ascertain for each individual product the conditions of treatment necessary to produce the diffuse colloid condition. We do not, therefore, desire to limit our invention to the precise substances or conditions illustrated, but what we claim and desire to secure by Letters Patent, is:

1. The new form of substantially dry colloid in which the diffuse submicroscopic structure of the colloid when wet is preserved to the extent that the colloid is capable of rapid hydration and dehydration.

2. The new form of substantially dry colloid in which the diffuse submicroscopic structure of the colloid when wet is sufficiently preserved in the substantially dry colloid so that the substantially dry colloid is capable of rapid hydration and dehydration and of rapidly adsorbing dyes.

3. The process of preparing diffuse colloids which consists in superhydration of the colloid followed by graduated dehydration of the colloid, the gradations of the second stage being so slight that the initial extension of the colloid mass is so far as possible preserved.

4. The process of treating colloids for preparation of specific hydrated products therefrom, which consists in superhydrating the colloid and then causing dehydration gradually to avoid condensation of the colloid residue.

5. The process of treating colloids for preparation of specific hydrated products therefrom, which consists in superhydrating the colloid and then causing dehydration in gradual stages by automatically changing the drying power of the dehydration agent.

6. The process of treating colloids to adapt them for subsequent uses, which consists in first superhydrating the colloid, then dehydrating the colloid in stages graduated by automatically increasing the drying power of the dehydrating agent to produce a product having a predetermined degree of hydration.

7. The process of treating colloids, which consists in superhydrating them, dehydrating them by stages graduated to preserve their power of aqueous adjustment, regulating the temperature of the final stage of the dehydrating treatment to produce a product having a predetermined degree of hydration.

In testimony whereof, we have signed our names to this specification, in the presence of subscribing witnesses.

WILLIAM M. GROSVENOR.

Witnesses:
  Jos. F. V. Harold,
  R. G. Bader.

LOUIS A. BEECHER.

Witnesses:
  William T. May,
  Thos. J. Sullivan.